United States Patent [19]
Ihara

[11] 3,851,898
[45] Dec. 3, 1974

[54] PIPE CONNECTING DEVICE FOR SUBMERSIBLE PUMP

[75] Inventor: Eiichi Ihara, Wakayama, Japan

[73] Assignee: Elepon Kogyo Kabushiki Kaishi, Osaka Pref., Japan

[22] Filed: Dec. 13, 1973

[21] Appl. No.: 424,619

[30] Foreign Application Priority Data
Dec. 19, 1972 Japan.............................. 47-146097

[52] U.S. Cl..................... 285/24, 285/179, 285/325
[51] Int. Cl............................................. F16l 37/26
[58] Field of Search ....... 285/24, 27, 325, 326, 327, 285/67, 18, 179; 403/331; 166/85, 88

[56] References Cited
UNITED STATES PATENTS

| | | | |
|---|---|---|---|
| 831,429 | 9/1906 | Harrington..................... | 285/325 X |
| 1,190,068 | 7/1916 | Abbott............................ | 285/325 X |
| 2,870,863 | 1/1959 | Bramhall........................ | 285/325 X |
| 3,365,215 | 1/1968 | Arzt et al........................ | 285/24 |
| 3,467,181 | 9/1969 | Maass............................. | 166/85 |
| 3,645,333 | 2/1972 | Maass............................. | 166/85 |

FOREIGN PATENTS OR APPLICATIONS

| 1,260,697 | 4/1961 | France.............................. 285/325 |
|---|---|---|

Primary Examiner—Thomas F. Callaghan
Attorney, Agent, or Firm—Donald D. Jeffery

[57] ABSTRACT

A pipe connecting device for a submersible pump by which the connection of a submersible pump with a liquid delivery pipe can be made and adjusted in a simple operation with use of adjusting screws and setting arms thereby eliminating the discrepancy in the joint faces to be caused by the deformation or wear of the pumping apparatus. Thus, the pumping efficiency is kept undiminished even after long hours of use.

1 Claim, 3 Drawing Figures

PIPE CONNECTING DEVICE FOR SUBMERSIBLE PUMP

BACKGROUND OF THE INVENTION

The present invention relates to a pipe connecting device for a submersible pump thereby facilitating the connection and disconnection of the outlet of a submersible pump with a liquid delivery pipe under water.

Various pipe connecting devices have previously been introduced among which is the connecting device described in Japanese Utility Model Application No. 111,730/72. However, with the conventional pipe connecting devices for submersible pumps, including that of said U.M. application, they can be put in use only after a preliminary fix-up of the respective joint faces of the outlet of the pump and the liquid delivery pipe for a good connection therebetween.

Despite such a preliminary fix-up, it is common for said joint faces to eventually become displaced and in such a case, the conventional pipe connecting devices have disadvantages in that they must be overhauled or refixed out of water to correct or adjust said discrepancy of the joint faces.

SUMMARY OF THE INVENTION

In view of the above noted disadvantages of conventional pipe connecting devices for submersible pumps, an object of the present invention is to provide a pipe connecting device for submersible pumps capable of carrying out a good connection between the outlet of a submersible pump and a liquid delivery pipe, and also permitting easy adjustment of the discrepancy of their joint faces in a simple operation by means of adjusting screws and setting arms provided in the device.

BRIEF DESCRIPTION OF THE APPLICATION DRAWINGS

The invention is described hereunder in detail with reference to the accompanying drawings in which.

DETAILED DESCRIPTION OF THE PREFERRED EMBODIMENT

Figures 1, 2:
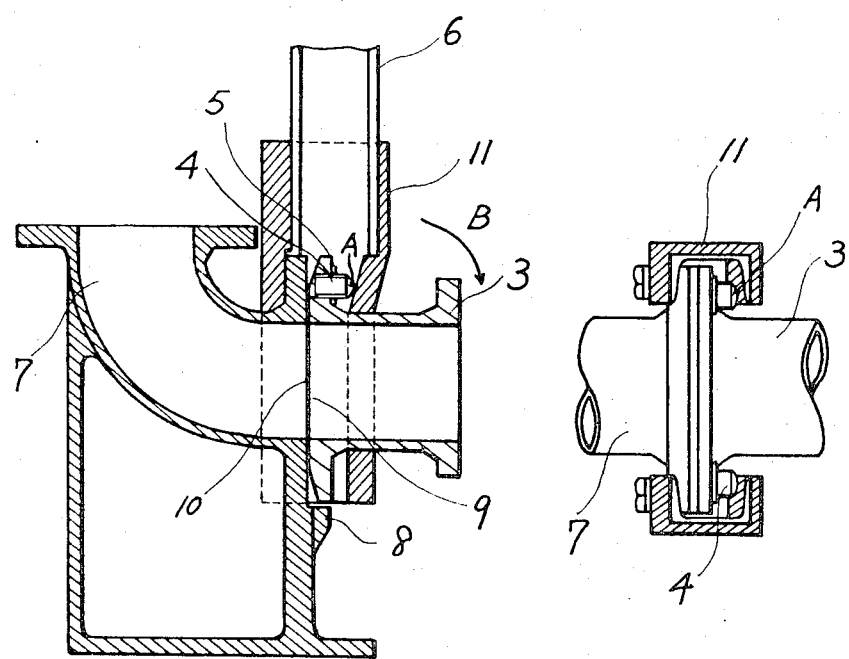
FIG. 1 is a vertical sectional view of the pipe connecting device according to the present invention.
FIG. 2 is a plan view of FIG. 1.
Figure 3:
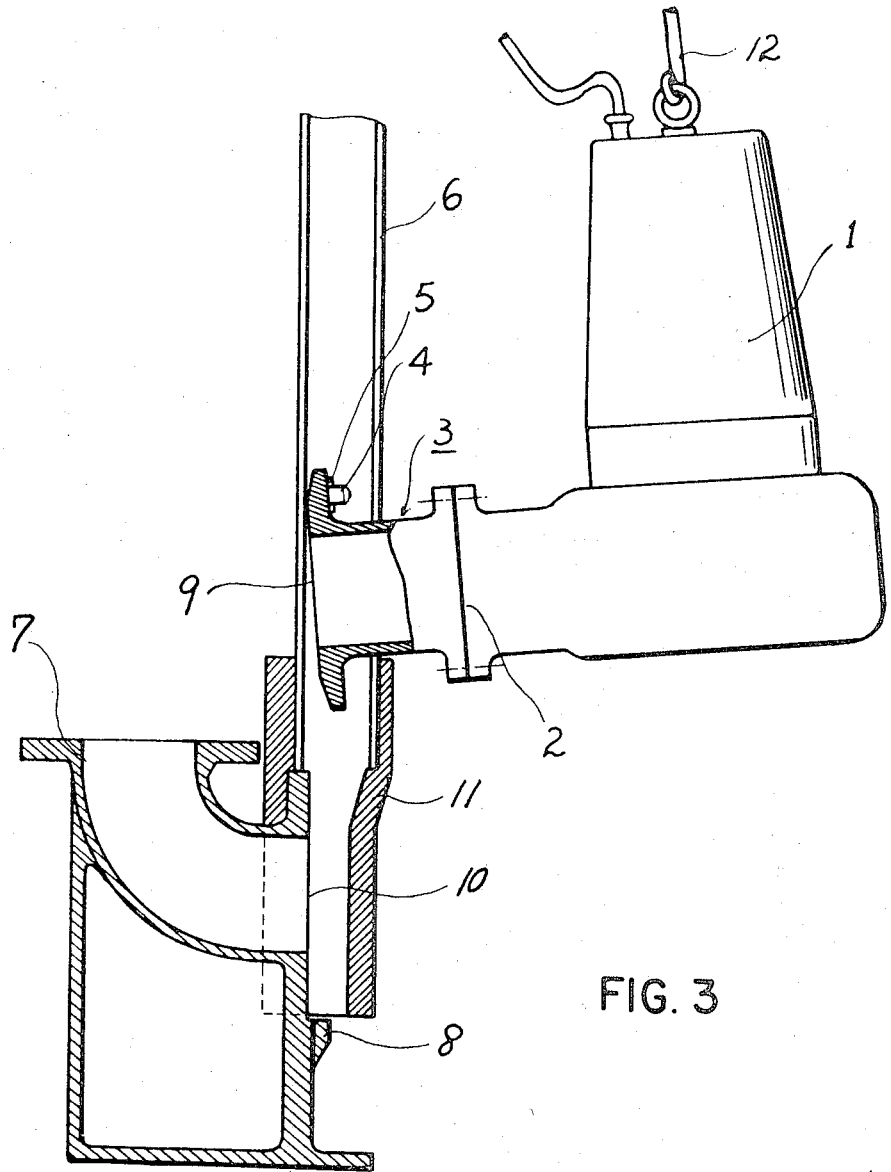
FIG. 3 shows the submersible pump disconnected from the liquid delivery pipe.

Referring now in detail to the drawings, wherein like parts are indicated by like reference numerals, the invention illustrated in FIGS. 1, 2 and 3 comprises a submersible pump 1 having an outlet. A pipe connecting member 3 is fixed to said outlet 2 having one or more adjusting screws, two being shown in the drawings, screwed into the front end flange of the connecting member so as to project through the upper back of said flange. The adjusting screws 4 are fixed in the desired position or length by means of locking nuts 5. A pair of guide members 6 of channel section are fixed to the delivery pipe 7 and extend upright with their insides facing against each other whereby said pipe connecting member 3 fixed to the outlet 2 of the pump 1 can freely slidably move along up and down with the liquid delivery pipe. Stoppers 8 are provided at the lower ends of said guide members 6 to stop the submersible pump at such a position that the joint face 9 of the front edge flange of the pipe connecting member 3 corresponds exactly to the joint face 10 of the rear edge flange of the liquid delivery pipe 7. Setting arms 11 are connected to the lower ends of the guide members 6 and tapered opposite to the upper portion of the joint face 10 of the rear edge flange of the liquid delivery pipe 7. A suspension rope 12 is provided to suspend the submersible pump 1. It will be noted that guide members 6 need not necessarily be constructed exactly as shown, and they may be of any construction as long as the pipe connecting member 3 can move freely slidably up and down therein.

Referring now to the operation of the present invention, the pipe connecting member 3 is first inserted between the guides 6 and lowered gradually in said guides 6 together with the submersible pump 1 connected thereto, the pump 1 being slightly downwardly inclined by the suspension rope 12. When the pipe connecting member 3 reaches a lowered position generally aligned with the joint face 10 of the opposite liquid deliver pipe 7, the submersible pump 1 will be prevented from dropping further due to the adjusting screws 4 coming in contact with the setting arms 11, as shown in FIG. 1.

After such a condition is attained, when the pump suspension rope 12 is further slackened, the submersible pump 1 will, by its self-weight, rotate in the direction of B on a fulcrum, namely the contact points A of the adjusting screws 4 with the setting arms 11 so that the joint face 9 of the pipe connecting member 3 and the joint face 10 of the liquid delivery pipe 7 will be joined together pressing against each other thus completing the connection between the submersible pump 1 and the liquid delivery pipe 7.

For disconnection of the submersible pump 1, the pump suspension rope 12 is pulled upwardly, the joint faces 9 and 10 are parted from each other, with the pipe connecting member 3 then being lifted upwards in the guide members 6 whereby the submersible pump 1 will be disconnected completely.

As above described, the present invention is so constructed that when the adjusting screws 4 are positioned at the contact points A, the lower end of the flange of the pipe connecting member 3 also reaches the stopper 8 to rest the pipe connecting member 3 thereon. Therefore, the weight of the pump 1 is effectively absorbed at three different points, namely, the contact points A, the joint face 10 of the liquid delivery pipe 7 and the stopper 8, so that the present invention has an effective advantage of reducing or preventing the deformation or wear of the guide members 6, the setting arms 11 and the pipe connecting member 3.

Further, as aforementioned, the present invention is so constructed as to be capable of adjusting screws 4 at an optional position or length by means of the locking nuts 5. Consequently, the alignment and contact of the joint face 9 of the pipe connecting member 3 and the joint face 10 of the liquid delivery pipe 7 can be adjusted in a simple operation by means of the adjusting screws 4. Thus, the invention eliminates the disadvantages hitherto experienced by the conventional pipe connecting devices for submersible pumps where the pumping efficiency is much reduced through the discrepancy of the joint faces caused by the deformation or wear taking place in the pipe connecting member, guides, etc. after long hours of use. The present invention, on the other hand, provides a submersible pump which operates satisfactorily and in which the pumping efficiency is kept high even after long hours of use.

I claim:

1. A pipe connecting device for a submersible pump comprising a pipe connecting member fixed to the outlet of a submersible pump, said pipe connecting member being provided with a flange at the leading end thereof, a plurality of adjusting screws extending through said flange of said pipe connecting member and projecting toward said outlet of said submersible pump, guide means for said pipe connecting member disposed at both sides of and operatively connected to a liquid delivery pipe, setting arms connected to the lower end of said guides and to said liquid delivery pipe, said setting arms being tapered in the area thereof opposite to the upper portion of the joint face of a rear edge flange of said liquid delivery pipe for contact by said adjusting screws, and suspension means for suspending said pump in a forward inclining position thereby to permit said pipe connecting member to be aligned with said liquid delivery pipe.

* * * * *